United States Patent
Okada et al.

(10) Patent No.: US 9,597,632 B2
(45) Date of Patent: Mar. 21, 2017

(54) SELECTIVELY $CO_2$-PERMEABLE MEMBRANE, METHOD FOR SEPARATING $CO_2$ FROM MIXED GAS, AND MEMBRANE SEPARATION EQUIPMENT

(71) Applicants: Renaissance Energy Research Corporation, Kyoto-shi, Kyoto (JP); National University Corporation Kobe University, Hyogo (JP)

(72) Inventors: Osamu Okada, Kyoto (JP); Nobuaki Hanai, Kyoto (JP); Eiji Kamio, Kobe (JP); Shohei Kasahara, Kobe (JP); Hideto Matsuyama, Kobe (JP)

(73) Assignees: Renaissance Energy Research Corporation, Kyoto (JP); National University Corporation Kobe University, Hyogo (JP)

( * ) Notice: Subject to any disclaimer, the term of this patent is extended or adjusted under 35 U.S.C. 154(b) by 48 days.

(21) Appl. No.: 14/377,075

(22) PCT Filed: Feb. 6, 2013

(86) PCT No.: PCT/JP2013/052743
§ 371 (c)(1),
(2) Date: Aug. 6, 2014

(87) PCT Pub. No.: WO2013/118776
PCT Pub. Date: Aug. 15, 2013

(65) Prior Publication Data
US 2014/0377156 A1    Dec. 25, 2014

(30) Foreign Application Priority Data
Feb. 6, 2012   (JP) .................................. 2012-023403

(51) Int. Cl.
*B01D 53/22* (2006.01)
*B01D 69/10* (2006.01)
(Continued)

(52) U.S. Cl.
CPC ...... *B01D 53/228* (2013.01); *B01D 2257/504* (2013.01); *Y02C 10/10* (2013.01)

(58) Field of Classification Search
None
See application file for complete search history.

(56) References Cited

U.S. PATENT DOCUMENTS

| 4,318,714 A | 3/1982 | Kimura et al. |
| 4,761,164 A | 8/1988 | Pez et al. |

(Continued)

FOREIGN PATENT DOCUMENTS

| DE | 102009026869 A1 | 2/2011 |
| JP | 2008-036464 A | 2/2008 |

(Continued)

OTHER PUBLICATIONS

Goodrich et al., "Effect of Water and Temperature on Absorption of CO2 by Amine-Functionalized Anion-Tethered Ionic Liquids," Journal of Physical Chemistry B, 115: 9140-9150 (2011).

(Continued)

*Primary Examiner* — Daniel Berns
(74) *Attorney, Agent, or Firm* — Morgan, Lewis & Bockius LLP (57) ABSTRACT

Disclosed is a $CO_2$ permselective membrane 1 having an amino acid ionic liquid and a porous membrane impregnated with the amino acid ionic liquid, wherein the amino acid ionic liquid contains a certain range of water.

8 Claims, 5 Drawing Sheets

(51) Int. Cl.
| | |
|---|---|
| *B01D 69/12* | (2006.01) |
| *B01D 69/14* | (2006.01) |
| *B01D 71/00* | (2006.01) |
| *B01D 71/06* | (2006.01) |
| *B01J 31/02* | (2006.01) |

(56) References Cited

U.S. PATENT DOCUMENTS

| | | |
|---|---|---|
| 5,749,941 A | 5/1998 | Jansen et al. |
| 2005/0129598 A1 | 6/2005 | Chinn et al. |
| 2011/0052466 A1* | 3/2011 | Liu ..................... B01D 53/228 423/230 |

FOREIGN PATENT DOCUMENTS

| | | |
|---|---|---|
| JP | 2010-163561 A | 7/2010 |
| JP | 2010-214324 A | 9/2010 |

OTHER PUBLICATIONS

Zhang et al., "Supported Absorption of CO2 by Tetrabutylphosphoniunn Amino Acid Ionic Liquids," Chemistry—A European Journal, 12: 4021-4026 (2006).
Extended European Search Report issued in counterpart European Patent Application No. 13746403.8 dated Sep. 23, 2015.
Chen et al., "Selective CO2 Separation from CO2-N2 Mixtures by Immobilized Glycine-Na-Glycerol Membranes," Industrial and Engineering Chemistry Research, 39: 2447-2458 (2000).
Hanioka et al., "CO2 separation facilitated by task-specific ionic liquids using a supported liquid membrane," Journal of Membrane Science, 314: 1-4 (2008).
Robeson, "The upper bound revisited," Journal of Membrane Science, 320: 390-400 (2008).
Yegani et al., "Selective separation of CO2 by using novel facilitated transport membrane at elevated temperatures and pressures," Journal of Membrane Science, 291: 157-164 (2007).
Muhammad et al., "Synthesis and Thermophysical Properties of Low Viscosity Amino Acid-Based Ionic Liquids," Journal of Chemical & Engineering Data, 56: 3157-3162 (2011).
Fukumoto et al., "Room Temperature Ionic Liquids from 20 Natural Amino Acids," Journal of the American Chemical Society Communications, 127: 2398-2399 (2005).
Bara et al., "Guide to CO2 Separations in Imidazolium-Based Room-Temperature Ionic Liquids," Industrial and Engineering Chemistry Research, 48: 2739-2751 (2009).
Shiflett et al., "Carbon Dioxide Capture Using Ionic Liquid 1-Butyl-3-methylimidazolium Acetate," Energy Fuels, 24: 5781-5789 (2010).
Myers et al., "High temperature separation of carbon dioxide/hydrogen mixtures using facilitated supported ionic liquid membranes," Journal of Membrane Science, 322: 28-31 (2008).
International Search Report issued in corresponding International Patent Application No. PCT/JP2013/052743 dated May 7, 2013.
International Preliminary Report on Patentability issued in corresponding International Patent Application No. PCT/JP2013/052743 dated Aug. 21, 2014.

* cited by examiner

SELECTIVELY $CO_2$-PERMEABLE MEMBRANE, METHOD FOR SEPARATING $CO_2$ FROM MIXED GAS, AND MEMBRANE SEPARATION EQUIPMENT

TECHNICAL FIELD

The present invention relates to a $CO_2$ permselective membrane, a method of separating $CO_2$ from mixture gases, and a membrane separation apparatus.

BACKGROUND ART

As $CO_2$ permselective membranes which can be used to separate $CO_2$ from mixture gases by selectively permeating $CO_2$, various polymeric membranes have been developed (for example, Non-Patent Literature 1). However, polymeric membranes generally physically permeate $CO_2$ based on solution diffusion mechanism, and thus, there is a limitation of the improvements in $CO_2$ permeability and $CO_2$ to $N_2$ selectivity ($CO_2/N_2$ selectivity).

Therefore, permeable membranes, referred to as facilitated transportation membrane, which selectively permeate gases by, in addition to solution diffusion mechanism, facilitated transportation mechanism using substances referred to as "carrier" selectively reacting with $CO_2$ have been investigated (for example, Non-Patent Literatures 2, 3). Facilitated transportation mechanism selectively permeates certain gases based on the reversible chemical reaction between certain gases and carriers in membrane. Furthermore, recently, permeable membranes using ionic liquids have been proposed as membranes intended for facilitated transportation mechanism (Non-Patent Literatures 4, 5).

CITATION LIST

Patent Literature

[Patent Literature 1] Japanese Patent Application Laid-Open No. 2010-214324

Non Patent Literature

[Non-Patent Literature 1] J. Membr. Sci., 2008, 320, 390-400
[Non-Patent Literature 2] Ind. Eng. Chem. Res., 2000, 39, 2447
[Non-Patent Literature 3] J. Membr. Sci., 2007, 291, 157
[Non-Patent Literature 4] J. Membr. Sci., 2008, 314, 1
[Non-Patent Literature 5] J. Membr. Sci., 2008, 322, 28
[Non-Patent Literature 6] J. Am. Chem. Soc. Communications, 2005, 127, 2398-2399
[Non-Patent Literature 7] J. Chem. Eng. Data., 2011, 56, 3157-3162

SUMMARY OF INVENTION

Technical Problem

According to conventional facilitated transportation membranes, although fairly good $CO_2$ permeance and $CO_2/N_2$ selectivity can be accomplished, it is still not necessarily sufficient and there have been a room for improvements. Furthermore, it is frequent to essentially need the presence of water in order to exert facilitated transportation mechanism, and thus, there have been a problem that permeation performance is susceptible to the influence of relative humidity and their applications are limited. For example, Patent Literature 1 discloses a carbon dioxide gas permselective membrane including an ionic liquid; however, in its paragraph 0057, from the view point of membrane performance, it is mentioned that the relative humidity of supply gases is preferably not less than 50% and not more than 100%.

On the other hand, with respect to the water content in imidazolium based amino acid ionic liquid which is one of the configurations of gas permeable membranes, in line 11 and beyond of REFERENCE (8) in the right column on p. 2399 of Non-Patent Literature 6, it is stated that the water content of produced amino acid ionic liquids after vacuum dried for 2 days at 80° C. is not more than 0.2% and the water content after producing salts is 0.4%. In Table 1 on p. 3158 of Non-Patent Literature 7, it is indicated that the water content in amino acid ionic liquids is an extremely low value in the level of 200 ppm.

The main object of the present invention is to provide $CO_2$ selective separation membrane capable of accomplishing sufficiently high $CO_2$ permeance and $CO_2/N_2$ selectivity.

Solution to Problem

The present invention is, in $CO_2$ permselective membrane having an amino acid ionic liquid and a porous membrane impregnated with the amino acid ionic liquid, as a result of diligent investigation, to accomplish sufficiently high $CO_2$ permeance and $CO_2/N_2$ selectivity by setting the water content in the amino acid ionic liquid in a suitable range.

According to the above $CO_2$ permselective membrane in accordance with the present invention, it is possible to accomplish a sufficiently high $CO_2$ permeance and $CO_2/N_2$ selectivity by regulating such that the water content in the amino acid ionic liquid preferably become 3-50 mass %, more preferably 5-20 mass %. It is believed that amino acid ions constituting the amino acid ionic liquid reversibly react with $CO_2$ to function as carriers of $CO_2$, contributing high $CO_2$ permeance and selectivity. As revealed by the present inventors in experimental results described below, the function of these amino acid ions are sufficiently exerted on both of dry conditions and high humidity environment.

The present invention also relates to a method of separating $CO_2$ from mixture gas, comprising a step of separating $CO_2$ from mixture gas by passing $CO_2$ in mixture gas containing $CO_2$ through the above $CO_2$ permselective membrane. According to this method, it is possible to efficiently separate $CO_2$ under both of dry conditions and high humidity environment. Therefore, when a portion with low humidity conditions, specifically, the conditions in which the relative humidity of the mixture gas is not more than 30% or the water vapor concentration of the mixture gas is not more than 30 mol % is contained, a method in accordance with the present invention is particularly useful.

$CO_2$ in the mixed gas may be allowed to permeate the $CO_2$ permselective membrane, while keeping the $CO_2$ permselective membrane and the mixed gas at a temperature of 60° C. or below, when the number of the tertiary amino groups contained in the amino acid ionic liquid is larger than the total number of the primary amino groups and the secondary amino groups contained in the amino acid ionic liquid. $CO_2$ in the mixed gas may be allowed to permeate the $CO_2$ permselective membrane, while keeping the $CO_2$ permselective membrane and the mixed gas at a temperature above 60° C., when the total number of the primary amino groups and the secondary amino groups contained in the amino acid ionic liquid is larger than or equal to the number of the tertiary amino groups contained in the amino acid ionic liquid.

In this way, further excellent $CO_2$ permeance or $CO_2/N_2$ selectivity can be obtained by controlling the temperature of the separating step, focusing on whether the amino group in the amino acid ionic liquid is mainly a primary amino group, a secondary amino group or a tertiary amino group. From a similar viewpoint, the $CO_2$ in the mixed gas may be allowed to permeate the $CO_2$ permselective membrane, while keeping the $CO_2$ permselective membrane and the mixed gas at a temperature above 60° C. and below 80° C., when the total number of the primary amino groups and the secondary amino groups contained in the amino acid ionic liquid is larger than or equal to the number of the tertiary amino groups contained in the amino acid ionic liquid and the number of the secondary amino groups contained in the amino acid ionic liquid is larger than the number of the primary amino groups contained in the amino acid ionic liquid.

Advantageous Effects of Invention

According to the present invention, a $CO_2$ selective separation membrane capable of accomplishing a sufficiently high $CO_2$ permeance and $CO_2/N_2$ selectivity is provided.

DESCRIPTION OF EMBODIMENTS

Hereinafter, preferred embodiments of the present invention are described in detail. However, the present invention is not limited to the following embodiments.

Figure 1:
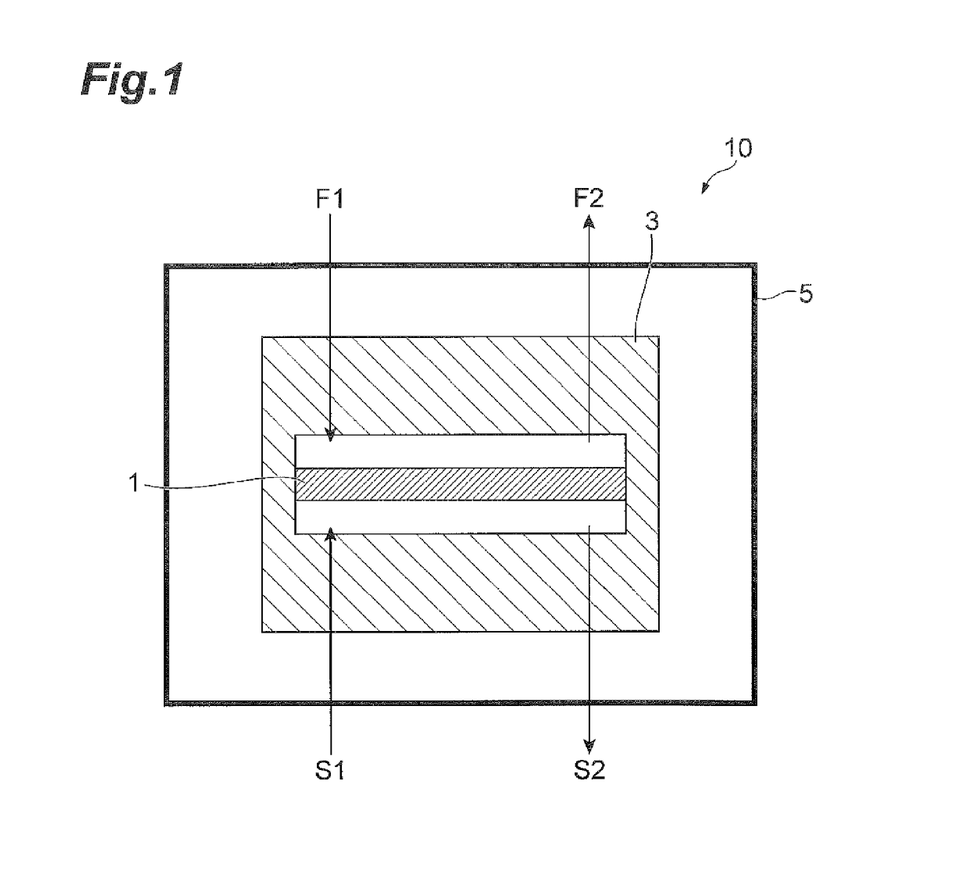
FIG. 1 is a schematic view showing an embodiment of a membrane separation apparatus.

FIG. 1 is a schematic view showing an embodiment of a membrane separation apparatus having $CO_2$ permselective membrane. A membrane separation apparatus 10 shown in FIG. 1 is composed essentially of $CO_2$ permselective membrane 1, permeation cell 3 containing $CO_2$ permselective membrane 1, and heating unit 5 heating the $CO_2$ permselective membrane 1.

In the interior of the permeation cell 3, a space to which $CO_2$ permselective membrane 1 is mounted is provided, and this space is divided into a feed-side portion and a sweep-side portion by $CO_2$ permselective membrane 1. A feed gas (mixture gas) F1 containing $CO_2$ is supplied to the feed-side portion, and expelled as feed gas F2. To the sweep-side portion, sweep gas S1 is usually supplied. The sweep gas S1 is generally inert gas such as helium gases. $CO_2$ gas which has been selectively permeated the $CO_2$ permselective membrane 1 and moved to the sweep-side portion is expelled as expel gas S2 together with the sweep gas. As a result, $CO_2$ is separated from the feed gas F1.

The $CO_2$ selective separation membrane 1 has an amino acid ionic liquid and a porous membrane impregnated with the amino acid ionic liquid.

The amino acid ionic liquid is an ionic liquid containing one or not less than two salts composed of amino acid ions and their counter ions and a small amount of water. The amino acid ions may be anions or cations but are preferably anions in terms of permeation performance. The amino acid ions and counter ions are arbitrarily selected in a combination forming an ionic liquid, respectively.

The amino acid ionic liquid contains preferably 3-50 mass % of, more preferably 5-20 mass % of water. This water content is a proportion on the basis of the mass of the entire amino acid ionic liquid. The amount of the water contained in the amino acid ionic liquid can be adjusted by an evaporating operation in preparing the amino acid ionic liquid or can be adjusted by adding any amount of water to the prepared amino acid ionic liquid.

The amino acid used as amino acid ions is any compound having: one or two or more kinds of an amino group selected from a primary amino group (—NH2), a secondary amino group (—NH—) and a tertiary amino group (—N=); and a carboxyl group, and may be natural or non-natural.

The amino acid ions are, for example, ions formed of at least one amino acid selected from the group consisting of arginine, histidine, lysine, aspartic acid, glutamic acid, serine, threonine, asparagine, glutamine, cysteine, glycine, proline, alanine, isoleucine, leucine, methionine, phenylalanine, tryptophan, tyrosine and valine. Part of or all of hydrogen atoms that these amino acids have may be substituted by a alkyl group or aryl group. For example, N-alkylamino acids and N-Arylamino acids having a secondary amino group, N,N-dialkylamino acids and N-Alkyl-N-Aryl amino acids can be employed.

Counter cations to be combined with amino acid anions are not essentially limited as long as being those forming ionic liquids with amino acid ions. These counter cations are, for example, at least one selected form the group consisting of imidazolium represented by formula (1), phosphonium represented by formula (2), ammonium represented by formula (3), pyridinium represented by formula (4), pyrrolidinium that may have a substituent (for example, an alkyl group), morpholinium that may have a substituent (for example, an alkyl group, an alkoxyalkyl groups) and guanidium that may have a substituent.

(4)

In formula (1), $R^1$ and $R^2$ each independently represent an alkyl group (preferably, an alkyl group of carbon number 1-10) which may have a substituent. Examples of this alkyl group include ethyl, butyl or hexyl. It is preferable that one of $R^1$ and $R^2$ is methyl. Specific examples of imidazolium include 1-ethyl-3-methylimidazolium, 1-butyl-3-methylimidazolium, and 1-hexyl-3-methylimidazolium.

In formula (2), $R^3$ represents an alkyl group (preferably, an alkyl group of carbon number 1-10) that may have a substituent, and a plurality of $R^3$ in the identical molecule may be the same or different and may be coupled with one another to form a ring. This alkyl group is, for example, butyl or hexyl. $R^3$ may be an alkyl group substituted by, for example, an amino group. Specific examples of phosphonium include tetrabutylphosphonium, tetrahexylphosphonium, tributyl(hexyl)phosphonium and aminopropyltributylphosphonium.

In formula (3), $R^4$ represents an alkyl group (preferably, an alkyl group of carbon number 1-10) that may have a substituent, and a plurality of $R^4$ in the identical molecule may be the same or different and may be coupled with one another to form a ring. This alkyl group is, for example, butyl or hexyl. Specific examples of ammonium include tetrabutylammonium, tetrahexylammonium and tributyl(hexyl)ammonium.

In formula (4), $R^5$ represents an alkyl group (preferably, an alkyl group of carbon number 1-10) that may have a substituent. This alkyl group is, for example, butyl or hexyl. Specific examples of pyridinium include 1-butylpyridinium and 1-hexylpyridinium.

The porous membrane can be appropriately selected from those that are generally used as supporting membranes for permselective membranes. The porous membrane may be hydrophilic or hydrophobic, but, in the case where amino acid ionic liquid is hydrophilic, is preferably hydrophilic. The porous membrane includes, for example, polytetrafluoroethylene. The thickness of the porous membrane is not particularly limited but is, for example, 10-100 μm. It is preferable that pores in the porous membrane are sufficiently filled with the amino acid ionic liquid; however they may be partially non-filled. The porous membrane may be, if needed, impregnated with, in addition to an amino acid ionic liquid, materials except amino acid ionic liquids. The types and amounts of these additional materials can be arbitrarily selected within the range not departing from the spirit of the present invention.

A $CO_2$ permselective membrane 1 can be manufactured by a method including a step of impregnating a porous membrane with an amino acid ionic liquid. It is possible to conduct the impregnation with a method generally used in the art.

When separating $CO_2$ from the feed gas F1 using a membrane separation apparatus 10, The temperature of the feed gas (mixed gas) passing through the membrane separation apparatus 10 and the $CO_2$ permselective membrane 1 is generally 10-150° C., and may be 80-110° C. The $CO_2$ permselective membrane 1 is heated if necessary. As a heating unit 5, for example, an oven capable of containing the permeation cell 3 is used.

The temperature of the $CO_2$ permselective membrane 1 and the mixed gas F1 may be set as described below, taking into consideration the type of the amino group in the amino acid contained in the amino acid ionic liquid constituting the $CO_2$ permselective membrane 1.

$CO_2$ may be separated from the mixed gas, for example, by employing a $CO_2$ permselective membrane containing an amino acid ionic liquid containing an amino acid having a tertiary amino group as a main component, while keeping the $CO_2$ permselective membrane and the mixed gas at a temperature of 60° C. or below. In this case, the lower limit of the temperature of the $CO_2$ permselective membrane and the mixed gas is not particularly limited but is, for example, 10° C. By employing the amino acid ionic liquid containing the amino acid having the tertiary amino group as a main component, still more satisfactory $CO_2$ permeance and $CO_2/N_2$ selectivity can be attained even at a low temperature of 60° C. or below.

The amino acid ionic liquid containing an amino acid having a tertiary amino group as a main component is, for example, that in which the number of the tertiary amino groups is larger than the total number of the primary amino groups and the secondary amino groups. Alternatively, as the amino acid ionic liquid containing an amino acid having a tertiary amino group as a main component, that containing an amino acid having a tertiary amino group only at 50 mol % or more, 60 mol % or more, 70 mol % or more, 80 mol % or more or 90 mol % or more of all the amino acids may be employed.

$CO_2$ may also be separated from the mixed gas by employing a $CO_2$ permselective membrane containing an ionic liquid containing an amino acid having a primary amino group or secondary amino group as a main component, while keeping the $CO_2$ permselective membrane and the mixed gas at a temperature above 60° C. In this case, the upper limit of the temperature of the $CO_2$ permselective membrane and the mixed gas is not particularly limited but is, for example, 200° C. By employing the amino acid ionic liquid containing an amino acid having a primary amino group or secondary amino group as a main component at a high temperature above 60° C., further excellent $CO_2$ permeance and $CO_2/N_2$ selectivity can be attained.

The amino acid ionic liquid containing an amino acid having a primary amino group or secondary amino group as a main component is, for example, that in which the total number of the primary amino groups and secondary amino groups is larger than the number of tertiary amino groups. Alternatively, as the ionic liquid containing an amino acid having a primary amino group or secondary amino group as a main component, an amino acid ionic liquid containing an amino acid having at least one of a primary amino group and secondary amino group only at 50 mol % or more, 60 mol % or more, 70 mol % or more, 80 mol % or more or 90 mol % or more of all the amino acids may be employed.

$CO_2$ may also be separated from the mixed gas by employing a $CO_2$ permselective membrane containing an amino acid ionic liquid containing an amino acid having a secondary amino group as a main component, while keeping the $CO_2$ permselective membrane and the mixed gas at a temperature above 60° C. and below 80° C. By employing the amino acid ionic liquid containing an amino acid having a secondary amino group as a main component at a temperature above 60° C. and below 80° C., still more excellent $CO_2$ permeance can be attained, while suppressing energy consumption for heating.

The amino acid ionic liquid containing an amino acid having a secondary amino group as a main component is, for example, that in which the total number of the primary amino groups and secondary amino groups is larger than the number of the tertiary amino groups and the number of the secondary amino groups is larger than the number of the primary amino groups. Alternatively, as the ionic liquid containing an amino acid having a secondary amino group as a main component, an amino acid ionic liquid containing an amino acid having a secondary amino group only at 50 mol % or more, 60 mol % or more, 70 mol % or more, 80 mol % or more or 90 mol % or more of all the amino acids may be employed.

Comparison of the numbers (mole numbers) of various amino groups in the amino acid ionic liquid as described above is usually performed based on the number of the amino groups in all the amino acids constituting the amino acid ionic liquid. That is, when a small amount of amine compounds other than the amino acids having an amino group are contained in the amino acid ionic liquid, the number of the amino groups of those amine compounds can be usually ignored.

The $CO_2$ permselective membrane containing the amino acid ionic liquid containing an amino acid having a tertiary amino group as a main component may be combined with the $CO_2$ permselective membrane containing the ionic liquid containing an amino acid having a primary amino group or secondary amino group as a main component or the $CO_2$ permselective membrane containing the amino acid ionic liquid containing an amino acid having a secondary amino group as a main component, as necessary. In this case, the temperature of each of the $CO_2$ permselective membranes can be set at the temperature ranges described above, respectively.

It is frequent that the feed gas F1 contains $N_2$ in addition to $CO_2$. According to a $CO_2$ permselective membrane in accordance with the present embodiment, even in a case where $CO_2$ partial pressure is low, a high $CO_2$ permeance and $CO_2/N_2$ selectivity is maintained. Therefore, when separating $CO_2$ from a mixture gas in which $CO_2$ partial pressure is not very high, a $CO_2$ permselective membrane in accordance with the present embodiment is particularly useful. Generally, there is a tendency that, as the feed gas flows toward downstream, $CO_2$ partial pressure in the feed gas decreases. Therefore, practically, in most cases, it is expected that a step of separating $CO_2$ from a mixture gas with a low $CO_2$ partial pressure is included. Specifically, the $CO_2$ partial pressure of the feed gas (mixture gas) F1 may be not more than 15 kPa.

Furthermore, according to $CO_2$ permselective membrane in accordance with the present embodiment, it is possible to accomplish a sufficiently high $CO_2$ permeance and $CO_2/N_2$ selectivity. Generally, in a facilitated transportation membrane, when separating $CO_2$ gas from mixture gas with low humidity, it is mostly required to add water vapor to the mixture gas; however, according to the present embodiment, it is possible to efficiently separate $CO_2$ without adding water vapor. Due to requiring a tremendous energy for the supply of water vapor, elimination of the need for water is of great environmental and economic significance. Specifically, the relative humidity of the feed gas (mixture gas) F1 may be less than 50%, not more than 30%, preferably not more than 5%. Also, the water vapor concentrations of the feed gas (mixture gas) F1 may be less than 30 mol %, preferably not more than 5 mol %.

The flow rates of the feed gas F1 are not particularly limited and are, for example, 2-1000 mL/minute per area 10 $cm^2$ of the $CO_2$ permselective membrane. The pressure of the feed gas is not particularly limited and may be atmospheric pressure or, for example, may be adjusted in a range of 100-10000 kPa or 100-1000 kPa.

The flow rates of the sweep gas S1 are not particularly limited and are, for example, 1-500 mL/minute per area 10 $cm^2$ of the $CO_2$ permselective membrane. The pressure of the sweep gas is not particularly limited and may be atmospheric pressure or less than atmospheric pressure or, for example, may be adjusted in a range of 30-5000 kPa or 30-1000 kPa. Such as in the case where $CO_2$ partial pressure in the feed gas is sufficiently high, sometimes, there is no need to necessarily pour the sweep gas.

The present invention is not limited to the above described embodiments and appropriate variations are possible within the range not departing from the spirit of the present invention. For example, optional layers may be laminated on one side or both sides of the $CO_2$ permselective membrane.

EXAMPLES

Hereinafter, with giving Examples, the present invention is further specifically described. However, the present invention is not limited to these Examples.

(Investigation 1)

As amino acid ionic liquids, tetrabutylphosphoniumglycine (hereinafter, referred to as "[P($C_4$)$_4$][Gly]") and 1-ethyl-3-methylimidazoliumglycine (hereinafter, referred to as "[Emim][Gly]") were provided. These amino acid ionic liquids were prepared by a neutralization method. An aqueous solution containing 40 mass % of tetrabutylphosphonium hydroxide (hereinafter, referred to as "[P($C_4$)$_4$][OH]") or an aqueous solution containing 50 mass % of 1-ethyl-3-methylimidazoliumglycine (hereinafter, referred to as "[Emim][OH]") was dropped to a glycine aqueous solution containing glycine in an amount of 5% more excessive than their mole number and 100 mL of pure water, while cooling to 8° C. in nitrogen atmosphere. Then, by stirring not less than 24 hours, neutralization reaction between hydroxide ions and amino acid derived hydrogen ions was conducted. After the neutralization reaction, water was removed at 40° C. by an evaporator. Water was removed until the amino acid ionic liquid to be prepared became a 90 mass % aqueous solution (water concentrations of 10 mass %). Porous membrane was impregnated with the amino acid ionic liquid by immersing hydrophilic polytetrafluoroethylene (PTFE) porous membrane (thickness of 35.7 μm, average pore diameter of 0.2 μm) in the amino acid ionic liquid prepared in this way and decompressing for 1800 seconds in the state. The porous membrane impregnated with the amino acid ionic liquid was retrieved and the redundant amino acid ionic liquid adhered to the surface was removed to obtain a permeable membrane for evaluation.

Likewise, a PTFE porous membrane was impregnated with 1-ethyl-3-methylimidazoliumbis(trifluoromethane)sulfonamide (hereinafter, referred to as "[Emim][$Tf_2N$]"), which was an ionic liquid, to obtain a permeable membrane for comparison.

Each permeable membrane provided was mounted to a permeation cell made from stainless steel. This permeation cell was accommodated in an oven to which thermostat was attached to provide an evaluation apparatus having a configuration similar to the apparatus shown in FIG. 1. By thermostat, the oven was adjusted to a predetermined temperature.

As a feed gas F1, a dried mixture gas ($CO_2$ partial pressure: 10 kPa) containing $CO_2$ gas and $N_2$ gas and substantially not containing water was used. The feed gas F1 was adjusted to a flow rate of 200 mL/minute and a temperature of 298K. Feed-side pressure was maintained at the atmospheric pressure. As a sweep gas S1, helium gas was used. The sweep gas S1 was adjusted to a flow rate of 40 mL/minute and a temperature of 298K. Sweep-side pressure was maintained at approximately atmospheric pressure. Sweep gas (expel gas) S2 of the outlet side was analyzed by gas chromatography (GC). From the analysis results of GC, the permeance of $CO_2$ and $N_2$ and $CO_2/N_2$ selectivity (=$CO_2$ permeance/$N_2$ permeance) were measured.

Evaluation results of the permeance and selectivity when a preset temperature of the oven was set to 363K or 373K were shown in Table 1.

TABLE 1

| | Temperature | $[P(C_4)_4]$ [Gly] | [Emim] [Gly] | [Emim] $[Tf_2N]$ |
|---|---|---|---|---|
| $CO_2$ Permeance (mol/($m^2 \cdot s \cdot kPa$)) | 363 K | $2.99 \times 10^{-5}$ | $4.96 \times 10^{-5}$ | $2.34 \times 10^{-5}$ |
| | 373 K | $4.74 \times 10^{-5}$ | $7.93 \times 10^{-5}$ | $2.45 \times 10^{-5}$ |
| $CO_2/N_2$ Selectivity | 363 K | 37.0 | 112 | 9.04 |
| | 373 K | 47.5 | 146 | 8.28 |

As shown in Table 1, the permeable membrane using $[P(C_4)_4]$[Gly] or [Emim][Gly] which is an amino acid ionic liquid exhibited an excellent $CO_2$ permeance and $CO_2/N_2$ selectivity under dry conditions, compared to [Emim]$[Tf_2N]$.

(Investigation 2)

Figure 2:
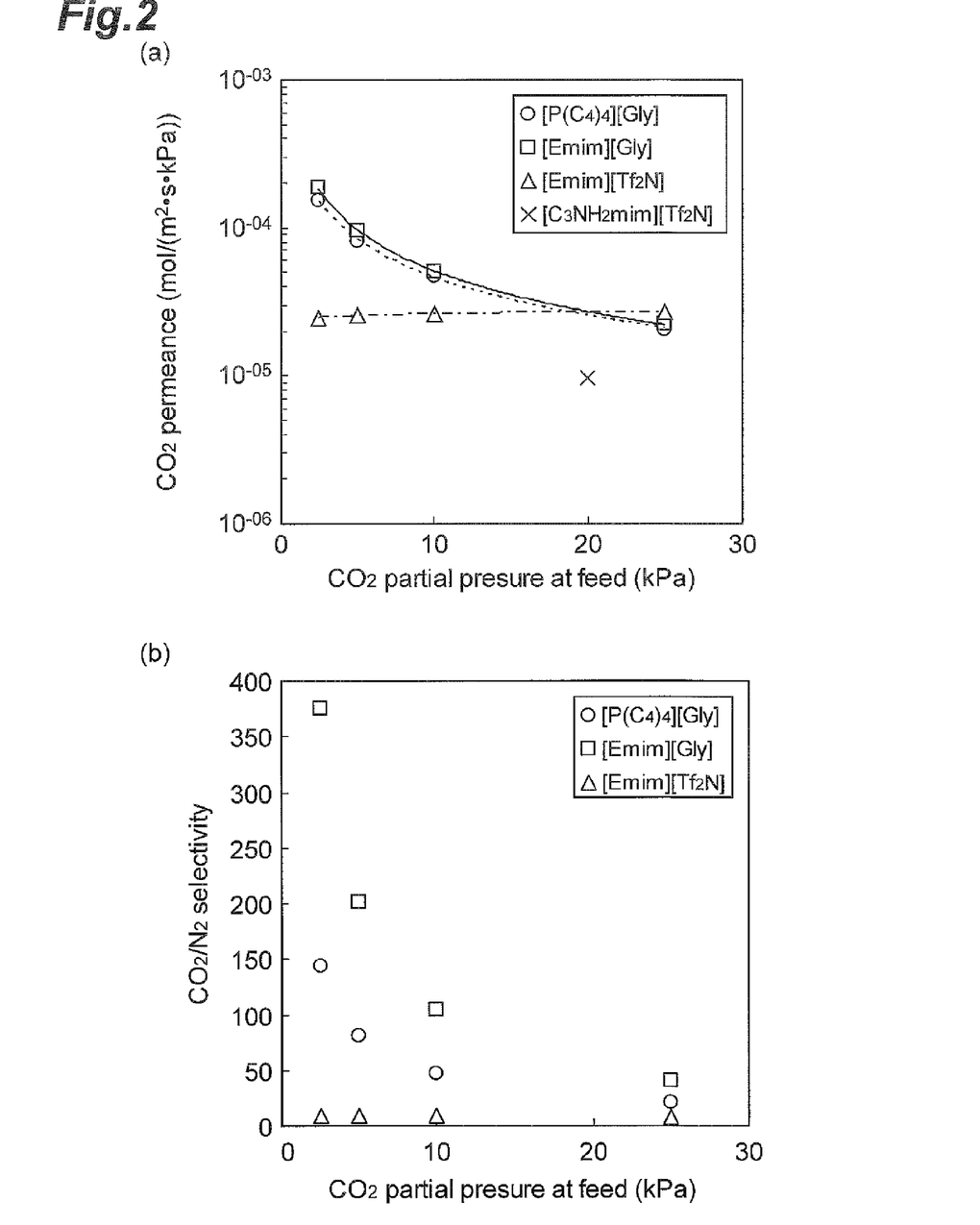
FIG. 2 is a graph showing a relationship between the permeation properties of $CO_2$ permselective membrane and $CO_2$ partial pressure.

In a method similar to as in investigation 1, while changing a $CO_2$ partial pressure in a feed gas S1, the measurements of permeance of $CO_2$ and $N_2$ and $CO_2/N_2$ selectivity were conducted. (a) of FIG. 2 is a graph representing a relationship between the $CO_2$ permeance and $CO_2$ partial pressure, and (b) of FIG. 2 is a graph representing a relationship between the $CO_2/N_2$ selectivity and $CO_2$ partial pressure. In (a) of FIG. 2, together with the results of the present experiment, the value of $CO_2$ permeance of a permeable membrane using N-aminopropyl-3-methylimidazoliumbis(trifluoromethylsulfonyl)imide ($[C_3NH_2min][Tf_2N]$) which is another ionic liquid was cited from Non-Patent Literature 5 and shown for comparison.

As shown in FIG. 2, permeable membrane using $[P(C_4)_4]$[Gly] or [Emim][Gly], particularly in the region of a low $CO_2$ partial pressure, exhibited an excellent $CO_2$ permeance and $CO_2/N_2$ selectivity compared to [Emim]$[Tf_2N]$. Also, it was indicated that under dry conditions, $[P(C_4)_4]$[Gly] or [Emim][Gly] exhibited a much excellent $CO_2$ permeance compared to $[C_3NH_2min][Tf_2N]$.

(Investigation 3)

In a method similar to as in the investigation 1, while changing the concentrations of water vapor in the feed gas F1, the measurements of permeance of $CO_2$ and $N_2$ and $CO_2/N_2$ selectivity were conducted. $CO_2$ partial pressure of the feed gas was set to 2 kPa. The temperature of an oven heating a permeation cell was set to 373K. For the comparison, a permeable membrane (facilitated transportation membrane) using DL-2,3-diaminopropionic acid (DAPA) as $CO_2$ carrier were provided and this was evaluated together with permeable membranes of $[P(C_4)_4]$[Gly], [Emim][Gly] and [Emim]$[Tf_2N]$.

A permeable membrane of DAPA was provided in the following procedure. Firstly, polyvinyl alcohol-polyacrylic acid copolymer (PVA/PAA copolymer), DAPA and CsOH were dissolved into water and stirred at 298K for 24 hours. The molar ratio of CsOH to DAPA was adjusted to 2. After stirring, minute bubbles were removed by centrifugation, followed by applying the solution to hydrophilic porous PTFE membrane. The applied solution was dried overnight at 298K. Finally, by heating at 393K for 2 hours to crosslink polymers, a permeable membrane of DAPA was obtained.

Figure 3:
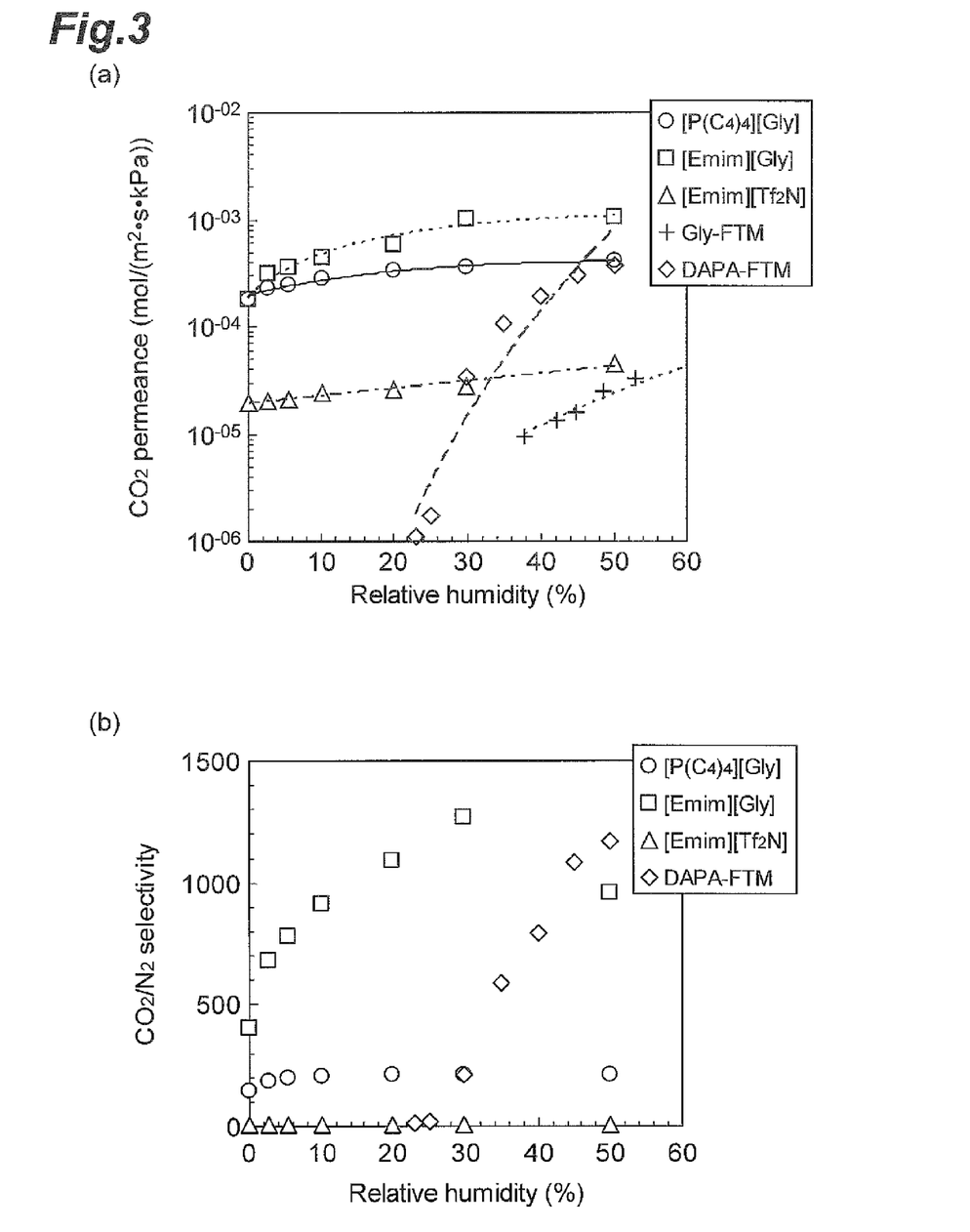
FIG. 3 is a graph showing a relationship between the permeation properties of the $CO_2$ permselective membrane and relative humidity.

(a) of FIG. 3 is a graph representing a relationship between the $CO_2$ permeance and relative humidity in a feed gas, and (b) of FIG. 3 is a graph representing a relationship between the $CO_2/N_2$ selectivity and relative humidity in a feed gas. In (a) of FIG. 3, together with the results of the present experiment, the value of $CO_2$ permeance of a facilitated transportation membrane (Gly-FTM) using glycine was cited from Non-Patent Literature 2 and shown for comparison. The temperature of the permeation cell is 373K and the pressure of the feed gas is atmospheric pressure, and therefore, the value of relative humidity (%) in FIG. 3 can, as it is, be translated into a value of water vapor concentrations (mol %).

As shown in FIG. 3, the permeable membrane using $[P(C_4)_4]$[Gly] or [Emim][Gly] exhibited a high $CO_2$ permeance and $CO_2/N_2$ selectivity, not only under dry conditions with a low steam concentrations but also under high humidity conditions. On the contrary to this, the facilitated transportation membrane of DAPA (DAPA-FTM) exhibited a relatively high $CO_2$ permeance and $CO_2/N_2$ selectivity under high humidity conditions; however, along with the decrease of relative humidity, $CO_2$ permeance and $CO_2/N_2$ selectivity were rapidly dropped. Gly-FTM is also in the similar tendency. Although [Emim]$[Tf_2N]$ exhibited a fairly high $CO_2$ permeance both under dry conditions and high humidity conditions, the $CO_2/N_2$ selectivity was generally low.

(Investigation 4)

As amino acid ionic liquids, tetrabutylphosphoniumalanine (hereinafter, referred to as "$[P(C_4)_4]$[Ala]") and tetrabutylphosphoniumserine (hereinafter, referred to as "$[P(C_4)_4]$[Ser]") were provided. For these, in a method similar to as in investigation 1, together with $[P(C_4)_4]$[Gly] and [Emim]$[Tf_2N]$, $CO_2$ permeance and $CO_2/N_2$ selectivity were evaluated.

TABLE 2

| | Temperature | $[P(C_4)_4]$ [Gly] | $[P(C_4)_4]$ [Ala] | $[P(C_4)_4]$ [Ser] | [Emim] $[Tf_2N]$ |
|---|---|---|---|---|---|
| $CO_2$ Permeance (mol/($m^2 \cdot s \cdot kPa$)) | 90° C. | $3.71 \times 10^{-5}$ | $2.75 \times 10^{-5}$ | $1.20 \times 10^{-5}$ | $2.10 \times 10^{-5}$ |
| $CO_2/N_2$ Selectivity | 90° C. | 35.1 | 36.3 | 19.1 | 9.04 |

As shown in Table 2, [P(C$_4$)$_4$][Ala] and [P(C$_4$)$_4$][Ser] which are amino acid ionic liquids exhibited, in similar to [P(C$_4$)$_4$][Gly], a high CO$_2$ permeance and CO$_2$ selectivity under dry conditions. Although [Emim][Tf$_2$N] exhibited a good CO$_2$ permeance, its CO$_2$/N$_2$ selectivity was low.

(Investigation 5)

As an amino acid ionic liquid, [P(C$_4$)$_4$][Gly] containing a predetermined amount of water was provided by a neutralization method. An aqueous solution containing 40 mass % of [P(C$_4$)$_4$][OH] was dropped to a glycine aqueous solution containing glycine in an amount of 5% more excessive than their mole number and pure water of 100 mL, while cooling to 8° C. in nitrogen atmosphere. Then, by stirring not less than 24 hours, neutralization reaction between hydroxide ions and amino acid derived hydrogen ions was conducted. After the neutralization reaction, water was removed at 40° C. by an evaporator. Water was removed until the concentrations of amino acid ionic liquid to be prepared became 100 mass %, 90 mass %, 80 mass %, or 50 mass % (water content is 0 mass %, 10 mass %, 20 mass % or 50 mass %). For amino acid ionic liquid prepared in this way, in a method similar to as in investigation 1, the CO$_2$ permeance and CO$_2$/N$_2$ selectivity were evaluated.

Figure 4:
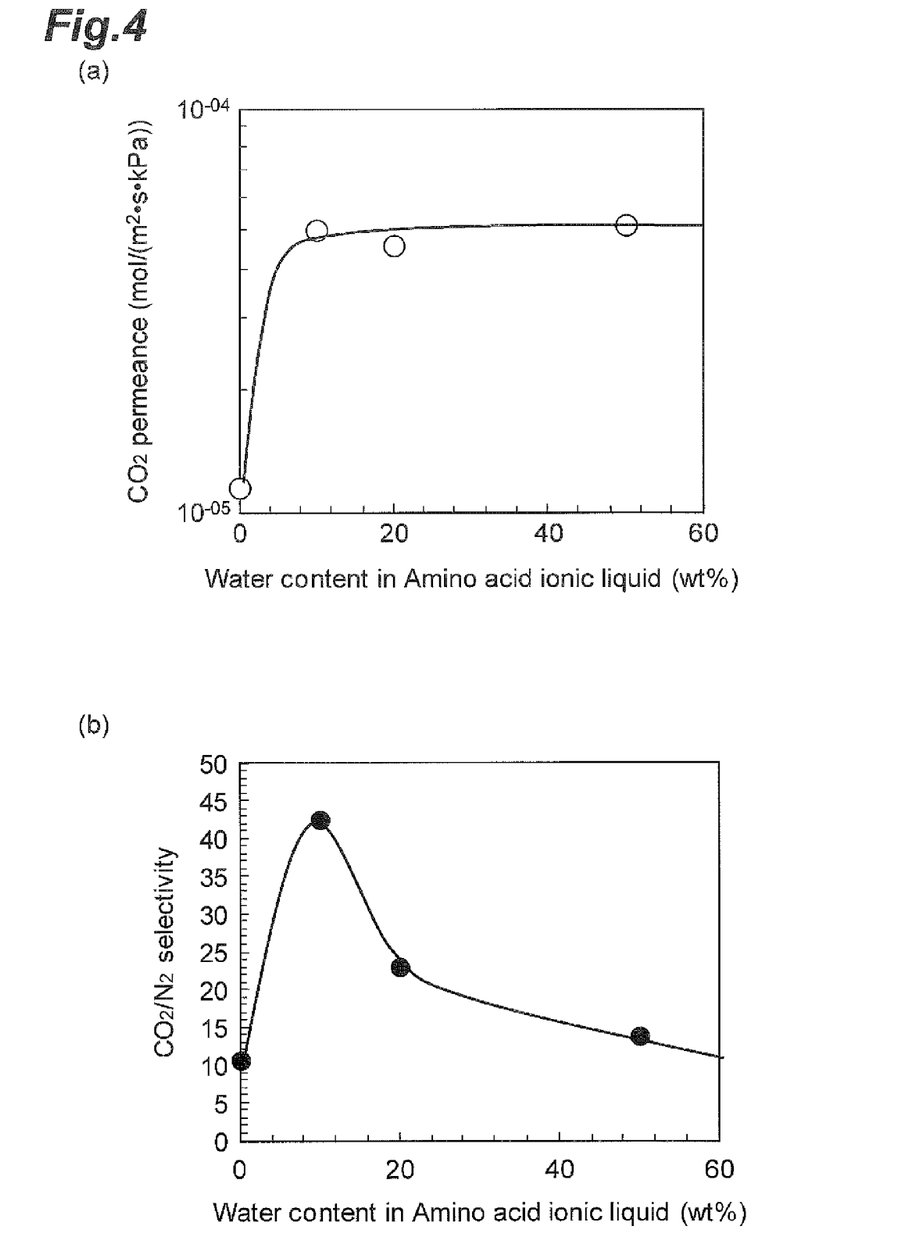
FIG. 4 is a graph showing a relationship between the permeation properties of the $CO_2$ permselective membrane and the water content of the amino acid ionic liquid.

(a) of FIG. 4 is a graph representing a relationship between the CO$_2$ permeance and the amount of water contained in the amino acid ionic liquid. (b) of FIG. 4 is a graph representing a relationship between the CO$_2$/N$_2$ selectivity and the amount of water contained in the amino acid ionic liquid.

As shown in FIG. 4(a) and FIG. 4(b), [P(C$_4$)$_4$][Gly] which is an amino acid ionic liquid containing 20 mass % of water exhibited, in similar to [P(C$_4$)$_4$][Gly] containing 10 mass % of water, a high CO$_2$ permeance and CO$_2$ selectivity under dry conditions. In [P(C$_4$)$_4$][Gly] of water content 0 mass %, both of CO$_2$ permeance and CO$_2$ selectivity were low. On the other hand, [P(C$_4$)$_4$][Gly] in which the water content is 50 mass % exhibited a good CO$_2$ permeance, but its CO$_2$/N$_2$ selectivity was low.

(Investigation 6)

As the amino acid ionic liquids, tetrabutylphosphonium glycin ([P(C$_4$)$_4$][Gly]), tetrabutylphosphonium N-methylglycin (hereinafter, referred to as [P(C$_4$)$_4$][mGlY]), and tetrabutylphosphonium N,N-dimethylglycin (hereinafter, referred to as [P(C$_4$)$_4$][dmGly]) were provided. CO$_2$ permeance and CO$_2$/N$_2$ selectivity were evaluated for these amino acid ionic liquids while changing the oven set temperature by the same procedure as in Investigation 1.

Figure 5:
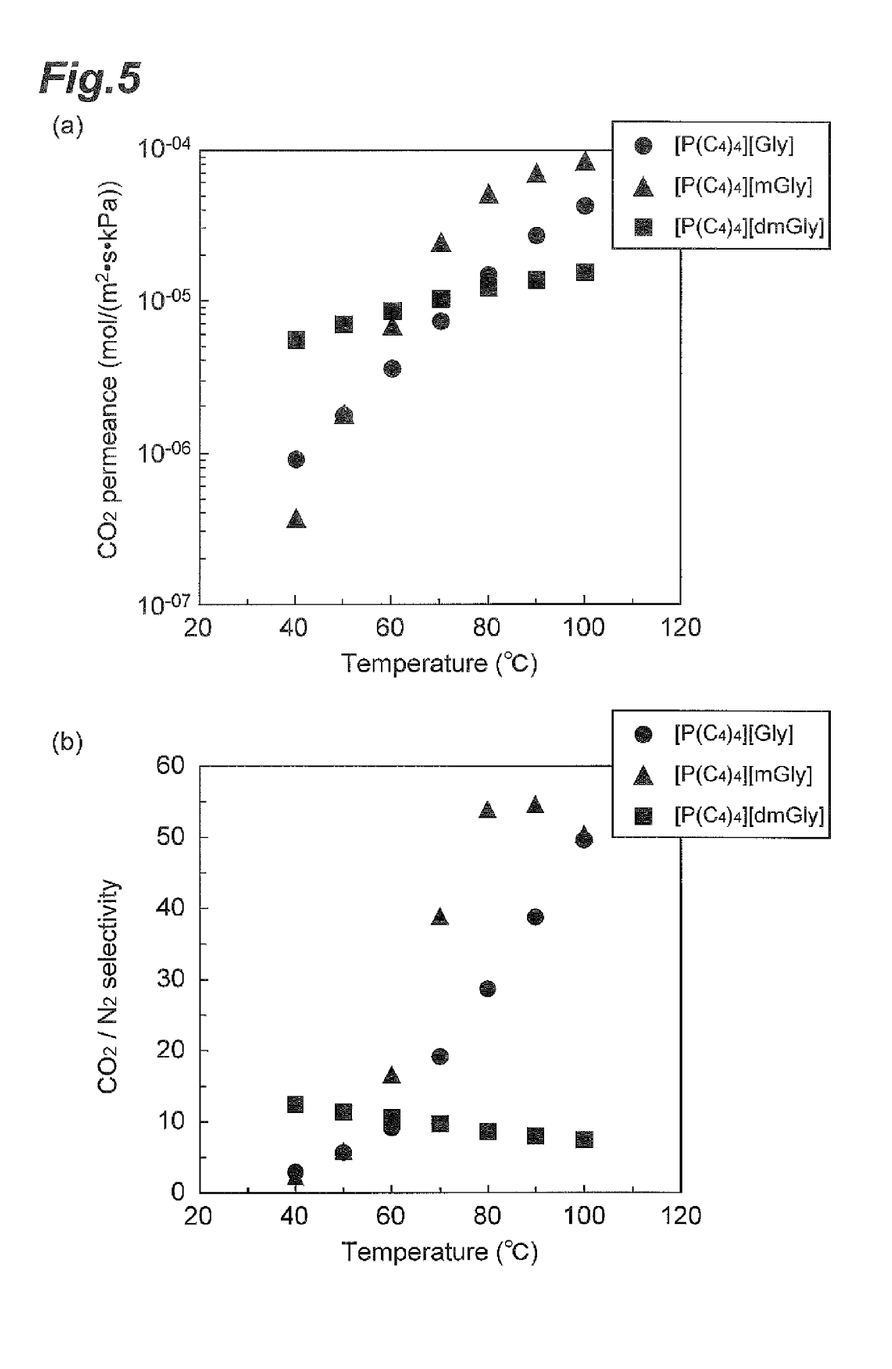
FIG. 5 is a graph showing a relationship between the permeation properties of the $CO_2$ permselective membrane and the temperature.

FIG. 5 (a) is a graph showing the relation between the CO$_2$ permeance and the oven set temperature (temperature of the mixed gas and the separation permeation membrane). FIG. 5 (b) is a graph showing the relation between the CO$_2$/N$_2$ selectivity and the oven set temperature (temperature of the separation permeation membrane).

As shown in FIG. 5, the separation permeation membrane employing [P(C$_4$)$_4$][dmGly] having a tertiary amino group exhibited the highest CO$_2$ permeance and CO$_2$/N$_2$ selectivity in the temperature range of 60° C. or below. The separation permeation membrane employing [P(C$_4$)$_4$][Gly] having a primary amino group or [P(C$_4$)$_4$][mGly] having a secondary amino group exhibited higher CO$_2$/N$_2$ selectivity in the temperature range above 60° C. The separation permeation membrane employing [P(C$_4$)$_4$][mGly] having a secondary amino group exhibited higher CO$_2$ permeance than that employing [P(C$_4$)$_4$][Gly] having a primary amino group or [P(C$_4$)$_4$][dmGly] having a tertiary amino group in the temperature range above 60° C. and below 80° C.

CONCLUSION

From the above experimental results, it is confirmed that, according to the present invention, a CO$_2$ permselective membrane capable of accomplishing a sufficiently high CO$_2$ permeance and CO$_2$/N$_2$ selectivity is provided. In addition, further excellent CO$_2$ permeance and CO$_2$/N$_2$ selectivity can be achieved by controlling the temperature, focusing on the type of amino groups in an amino acid.

INDUSTRIAL APPLICABILITY

A CO$_2$ permselective membrane in accordance with the present invention is sufficiently prospected for applications to air cleaning such as for residence space of building and space within vehicles and also to CO$_2$ removal from natural gases and the like.

REFERENCE SIGNS LIST

1: CO$_2$ permselective membrane, 3: permeation cell, 5: heating unit, 10: membrane separation apparatus, F1, F2: feed gas (mixed gas), S1, S2: sweep gas (expel gas).

The invention claimed is:
1. A CO$_2$ permselective membrane, comprising:
an amino acid ionic liquid; and
a porous membrane impregnated with the amino acid ionic liquid,
wherein the amino acid ionic liquid contains from 10 mass % to 20 mass % of water.

2. A membrane separation apparatus comprising the CO$_2$ permselective membrane according to claim 1.

3. A method of separating CO$_2$ from a mixed gas, comprising a step of separating CO$_2$ from the mixed gas by passing CO$_2$ in a mixed gas containing CO$_2$ through the CO$_2$ permselective membrane according to claim 1.

4. The method according to claim 3 wherein the step of separating CO$_2$ from the mixed gas comprises a part in which a relative humidity in the mixed gas is less than 50% or a steam concentration in the mixed gas is less than 30 mol %.

5. The method according to claim 3 wherein,
in the step of separating CO$_2$ from the mixed gas,
CO$_2$ in the mixed gas is allowed to permeate the CO$_2$ permselective membrane, while keeping the CO$_2$ permselective membrane and the mixed gas at a temperature of 60° C. or below, when the number of tertiary amino groups contained in the amino acid ionic liquid is larger than the total number of primary amino groups and the secondary amino groups contained in the amino acid ionic liquid, and
CO$_2$ in the mixed gas is allowed to permeate the CO$_2$ permselective membrane, while keeping the CO$_2$ permselective membrane and the mixed gas at a temperature above 60° C., when the total number of primary amino groups and the secondary amino groups contained in the amino acid ionic liquid is larger than or equal to the number of tertiary amino groups contained in the amino acid ionic liquid.

6. The method according to claim 5 wherein the step of separating CO$_2$ from the mixed gas comprises a part in which a relative humidity in the mixed gas is less than 50% or a steam concentration in the mixed gas is less than 30 mol %.

7. The method according to claim 5 wherein,
in the step of separating $CO_2$ from the mixed gas,
$CO_2$ in the mixed gas is allowed to permeate the $CO_2$ permselective membrane, while keeping the $CO_2$ permselective membrane and the mixed gas at a temperature above 60° C. and below 80° C., when the total number of primary amino groups and secondary amino groups contained in the amino acid ionic liquid is larger than or equal to the number of tertiary amino groups contained in the amino acid ionic liquid and the number of secondary amino groups contained in the amino acid ionic liquid is larger than the number of primary amino groups contained in the amino acid ionic liquid.

8. The method according to claim 7 wherein the step of separating $CO_2$ from the mixed gas comprises a part in which a relative humidity in the mixed gas is less than 50% or a steam concentration in the mixed gas is less than 30 mol %.

* * * * *